United States Patent
Luo et al.

(10) Patent No.: US 8,467,911 B2
(45) Date of Patent: Jun. 18, 2013

(54) ENERGY MANAGEMENT DEVICE AND METHOD

(75) Inventors: Yi Luo, Shenzhen (CN); Shang-Jue Ding, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 396 days.

(21) Appl. No.: 12/915,060

(22) Filed: Oct. 29, 2010

(65) Prior Publication Data

US 2012/0059530 A1   Mar. 8, 2012

(30) Foreign Application Priority Data

Sep. 7, 2010   (CN) .......................... 2010 1 0274593

(51) Int. Cl.
*G06F 1/28* (2006.01)
(52) U.S. Cl.
USPC ........................................... 700/296; 700/22
(58) Field of Classification Search
USPC ............. 700/9, 12, 14, 19, 22, 275, 276, 295, 700/296
See application file for complete search history.

(56) References Cited

U.S. PATENT DOCUMENTS

| | | | | |
|---|---|---|---|---|
| 7,009,348 B2 * | 3/2006 | Mogilner et al. | ............. | 315/307 |
| 7,499,978 B2 * | 3/2009 | Kim | ............................... | 709/208 |
| 7,504,938 B2 * | 3/2009 | Eiza | ............................... | 340/538 |
| 7,573,372 B2 * | 8/2009 | Mogilner et al. | .......... | 340/12.32 |
| 7,813,842 B2 * | 10/2010 | Iwamura | ........................ | 700/292 |
| 8,036,321 B2 * | 10/2011 | Mogilner et al. | ............. | 375/340 |
| 8,212,883 B2 * | 7/2012 | Wilson et al. | ............. | 348/211.11 |
| 2002/0065583 A1 * | 5/2002 | Okada et al. | ................... | 700/295 |
| 2004/0148632 A1 * | 7/2004 | Park et al. | ........................ | 725/81 |
| 2004/0257237 A1 * | 12/2004 | Bialecki et al. | ............. | 340/686.1 |
| 2005/0009498 A1 * | 1/2005 | Ho et al. | ........................ | 455/402 |
| 2005/0267605 A1 * | 12/2005 | Lee et al. | ......................... | 700/19 |
| 2008/0157938 A1 * | 7/2008 | Sutardja | ................... | 340/310.11 |

* cited by examiner

*Primary Examiner* — Charles Kasenge
(74) *Attorney, Agent, or Firm* — Altis Law Group, Inc.

(57) ABSTRACT

An energy management device manages a plurality of monitored devices distributed in a plurality of monitored areas. The energy management device determines whether a current time of each monitored area is during a monitored time of the energy management device. The energy management device acquires an area identifier and a body presence information from each of the monitored areas, and determines whether one or more monitored areas are under control and without body presence. If one or more monitored areas are under control and without body presence, the energy management device transmits one or more power-off commands to turn off the monitored devices located in the one or more monitored areas.

8 Claims, 4 Drawing Sheets

ENERGY MANAGEMENT DEVICE AND METHOD

BACKGROUND

1. Technical Field

The present disclosure relates to network communications, and more particularly to an energy management device and method.

2. Description of Related Art

Office and home electric appliances are widely used all over the world. Energy consumption of the electric appliances has greatly increased, as well as carbon dioxide generated by the electrical appliances. The consumed energy requires more resources, and the generated carbon dioxide is destroying the environment of the Earth. In order to obtain sustainable development of the earth in the future and meet the requirement for the electric appliances in our daily life, one solution is to develop power saving technology.

Therefore, it is a big challenge to provide an energy management method that can reduce energy consumption and costs.

BRIEF DESCRIPTION OF THE DRAWINGS

The details of the disclosure, both as to its structure and operation, can best be understood by referring to the accompanying drawing, in which like reference numbers and designations refer to like elements.

DETAILED DESCRIPTION

All of the processes described may be embodied in, and fully automated via, software code modules executed by one or more general purpose computers or processors. The code modules may be stored in any type of computer-readable medium or other storage device. Some or all of the methods may alternatively be embodied in specialized computer hardware or communication apparatus.

Figure 1:
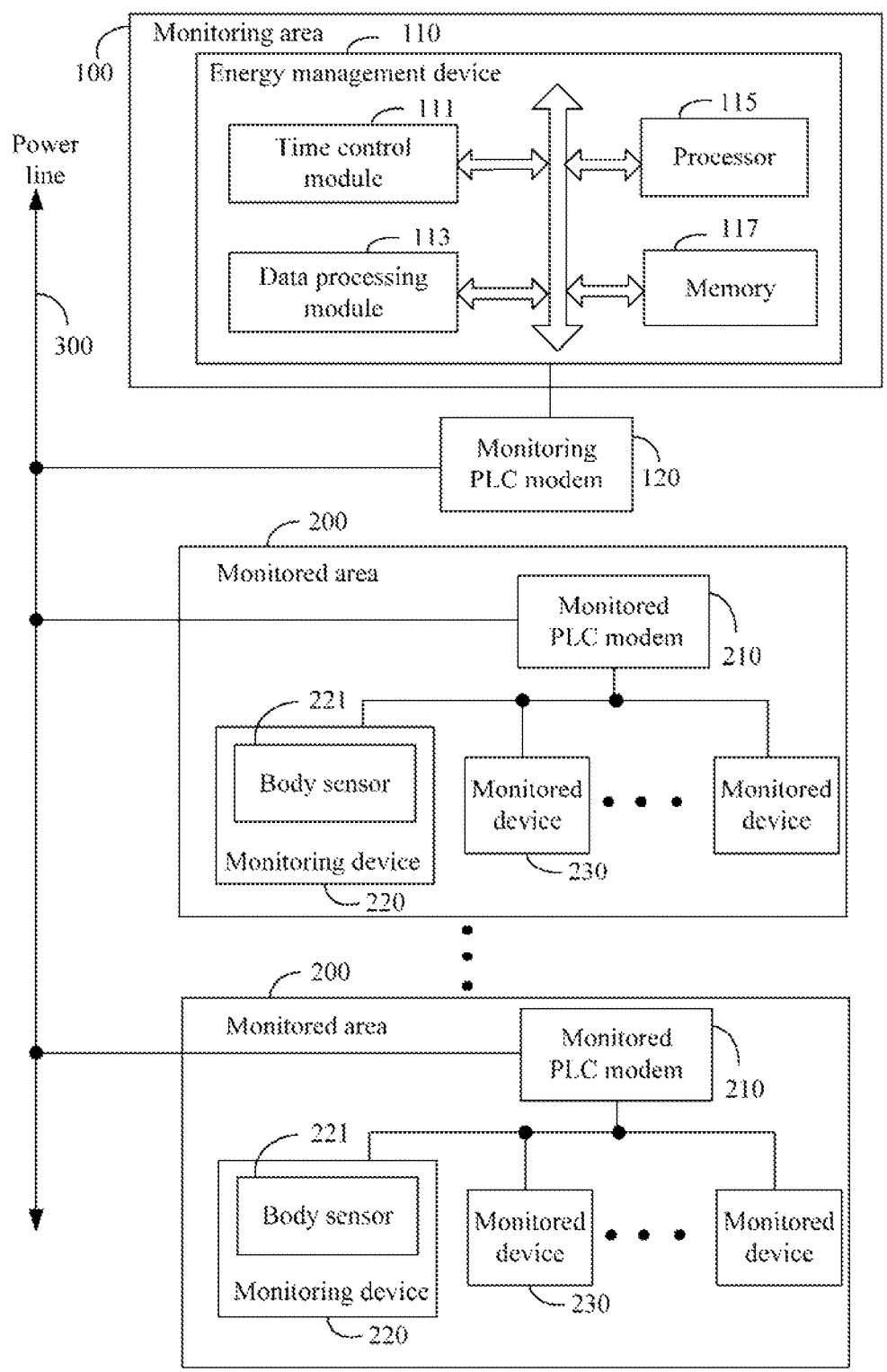
FIG. 1 is a schematic diagram of an application environment and functional modules of one embodiment of an energy management device in accordance with the present disclosure.

FIG. 1 is a schematic diagram of an application environment and functional modules of one embodiment of an energy management device 110 in accordance with the present disclosure. In one embodiment, the energy management device 110 is located in a monitoring area 100 including a monitoring power line communication (PLC) modem 120. The energy management device 110 manages a plurality of monitored devices 230 distributed in a plurality of monitored area 200. Each monitored area 200 has an area identifier (ID) to identify itself from other monitored areas. For example, the area identifier of each monitored area 200 may be 1#, 2#, and so on. One monitored area 200 with 1# may be a research and design (R&D) room and another monitored area 200 with 2# may be a test lab when the preset disclosure is applied to office. Each monitored area 200 includes a monitored PLC modem 210, a monitoring device 220, and one or more monitored devices 230. The monitoring device 220 helps the energy management device 110 to manage the plurality of monitored devices 230.

Each electronic device (such as the energy management device 110 and the monitoring PLC modem 120) located in the monitoring area 100 and each electronic device (such as the monitored PLC modem 210, the monitoring device 220, and one or more monitored devices 230) located in the monitored area 200 are connected via a power line 300 to establish a PLC. In one example, plugs of all the electronic devices are inserted in sockets of the power line 300, and then all the electronic devices establish the PLC without additional power lines.

In one embodiment, each monitored area 200 may be under control or not under control. One monitored area 200 under control indicates that the monitored devices 230 located in the one monitored area 200 can be powered off if no person is present in the one monitored area 200 during a monitored time of the energy management device 100. In one example, the monitored time may be from 00:01 to 07:30 and from 23:00 to 24:00 if the energy management device 110 is applied to manage office energy. One monitored area 200 not under control indicates that the monitored devices 230 located in the one monitored area 200 cannot be powered off even if no person is present in the one monitored area 200 during the monitored time.

In one embodiment, when the energy management device 110 is applied to manage office energy, the energy management device 110 may be a server, the monitoring area 100 may be a central machine room, and the plurality of monitored areas 200 may include a research and design (R&D) room with an area identifier 1#, a test lab with an area identifier 2#, a human resource office room with an area identifier 3#, a production line area with an area identifier 4#, for example. Part of the monitored areas 200, such as the R&D room and the human resource office room, may be under control, so the energy management device 110 can power off the monitored devices 230 located in the part of the monitored areas 200 if no person is present in the part of the monitored areas 200 during the monitored time. The remaining of the monitored areas 200, such as the test lab and the production line area, may be not under control, so the energy management device 110 cannot power off the monitored devices 230 located in the remaining of monitored areas 200 even if no person is present in the remaining of the monitored areas 200.

In another embodiment, when the energy management device 110 is applied to manage home energy, the energy management device 110 may be a home gateway or a set-top box, the monitoring area 100 may be a living room, and the plurality of monitored areas 200 may include a dining room with an area identifier 11#, a bedroom with an area identifier 12#, a study room with an area identifier 13#, for example. In such a case, all the monitored areas 200, such as the dining room, the bedroom, the study room, may be under control, so the energy management device 110 can power off the monitored devices 230 located in all the monitored areas 200 if no person is present in the monitored areas 200 during monitored time.

Each monitoring device 220 detects whether a human body is present in each monitored area 200 via a body sensor 221, and transmits body presence information of each monitored area 200 to the energy management device 110 via the monitored PLC modem 210 and the monitoring PLC modem 120. It may be appreciated that the body sensor 221 is a physical sensor employing software to detect a human body using any one of conventional means, such as a heat sensor or a movement sensor. In one embodiment, each monitoring device 220 may actively multi-cast the body presence information of each monitored area 200 to the energy management device 110 via the monitored PLC modem 210 and the monitoring PLC modem 120. In another embodiment, each monitoring device 220 may passively respond the body presence information of each monitored area 200 to the energy management device 110 according to a request from the energy management device 110.

Each monitored PLC modem 210 acquires working states (such as turning on/off) of the plurality of monitored devices 230 in each monitored area 200, and determines whether one or more monitored devices 230 are turned on in each monitored area 200. If one or more monitored devices 230 are turned on in one monitored area 200, the monitored PLC modem 210 transmits the area identifier of the one monitored area 200 to the energy management device 110 via the monitoring PLC modem 120. In one embodiment, the monitored PLC modem 210 may actively multi-cast the area identifier of the one monitored area 200 to the energy management device 110. In another embodiment, the monitoring device 220 may passively respond the area identifier of the one monitored area 200 to the energy management device 110 according to a request from the energy management device 110.

Then, the energy management device 110 acquires the area identifier and the body presence information from each monitored area 200 during the monitored time, and determines whether one or more monitored areas 200 are under control and without body presence. If one or more monitored areas 200 are under control and without body presence, the energy management device 110 transmits one or more power-off commands to turn off the monitored devices 230 located in the one or more monitored areas 200, such that power consumption is reduced.

Figure 2:
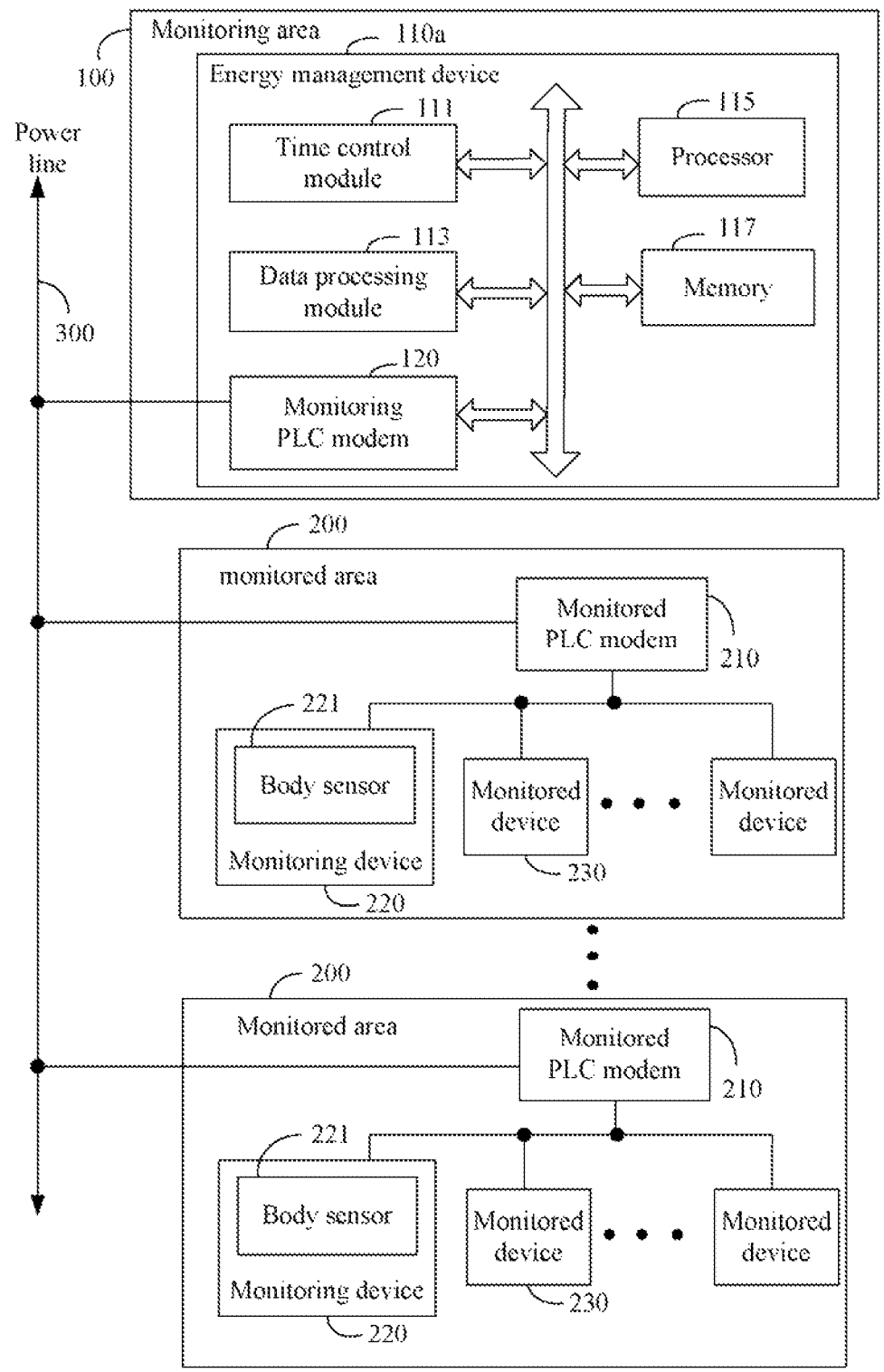
FIG. 2 is a schematic diagram of an application environment and functional modules of another embodiment of an energy management device in accordance with the present disclosure.

It should be noted that the monitoring PLC modem 120 can not only be a device independent of the energy management device 110 shown in FIG. 1, but also be integrated in the energy management device 110a shown in FIG. 2. Similarly, the monitored PLC modem 210 can not only be a device independent of the monitored devices 230 (shown in FIG. 1), but also be integrated in any one of the monitored devices 230 (not shown). Similarly, the monitoring device 220 can not only be a device independent of the monitored devices 230 (shown in FIG. 1), but also be integrated in any one of the monitored devices 230 (not shown).

In one embodiment, the energy management device 110 includes a time control module 111, a data processing module 113, at least one processor 115, and a memory 117. The modules 111 and 113 may comprise computerized code in the form of one or more programs that are stored in the memory 117. The computerized code includes instructions that are executed by the at least one processor 115 to provide functions for the modules 111 and 113.

The memory 117 is further operable to store a plurality of area identifiers of the monitored areas 200 under control. In one embodiment, one monitored area 200 under control indicates that the monitored devices 230 located in the one monitored area 200 can be powered off if no person is present in the one monitored areas 200 during the monitored time. In one example, the monitored time may be from 00:01 to 07:30 and from 23:00 to 24:00 if the energy management device 100 is applied to manage office energy.

If the energy management device 100 is applied to manage office energy, the monitored areas 200 under control may include part of the monitored areas 200 of the office, such as a human resource office room and a research and design (R&D) room. If the energy management device 100 is applied to manage home energy, the monitored areas 200 under control may include all the monitored areas 200 of the home, such as a dining room, a bedroom, and a study room.

The time control module 111 is operable to determine whether a current time of each monitored area 200 is during a monitored time of the energy management device 110. The data processing module 113 is operable to acquire the area identifier and the body presence information from each monitored area 200 when the current time is during the monitored time. The data processing module 113 is further operable to determine whether one or more monitored areas 200 are under control and without body presence according to the area identifier and the body presence information from each monitored area 200, and transmit one or more power-off commands to turn off the monitored devices 230 located in the one or more monitored areas 200 under control without body presence.

In one embodiment, each monitored PLC modem 210 determines whether at least one monitored device 230 is turned on in each monitored area 200, and multi-casts the area identifier of each monitored area 200 with at least one monitored device 230 turned on. Then, the monitoring PLC modem 120 receives the area identifier of each monitored area 200 from the monitored PLC modem 210, and transmits the area identifier of each monitored area 200 to the data processing module 113. Accordingly, the data processing module 113 receives the area identifier of each monitored area 200 from the monitoring PLC modem 120.

In another embodiment, the data processing module 113 transmits a first multi-cast request to each monitored area 200 via the monitoring PLC modem 120 so as to request the area identifier of each monitored area 200. After receiving the first multi-cast request, each monitored PLC modem 210 determines whether at least one monitored device 230 is turned on in each monitored area 200. If at least one monitored device 230 is turned on in one monitored area 200, the monitored PLC modem 210 responds the area identifier of the one monitored area 200 to the monitoring PLC modem 120. Then, the monitoring PLC modem 120 transmits the area identifier of the one monitored area 200 to the data processing module 113. Accordingly, the data processing module 113 receives the area identifier of the one monitored area 200 from the monitoring PLC modem 120.

In one embodiment, each monitored PLC modem 210 detects whether a human body is present in each monitored area 200 via the body sensor 221, and multi-casts body presence information of each monitored area 200. Then, the monitoring PLC modem 120 receives the body presence information of each monitored area 200 from the monitored PLC modem 210, and transmits the area identifier of each monitored area 200 to the data processing module 113. Accordingly, the data processing module 113 receives the body presence information of each monitored area 200 from the monitoring PLC modem 120.

In another embodiment, the data processing module 113 transmits a second multi-cast request to each monitored area 200 via the monitoring PLC modem 120 so as to request the body presence information of each monitored area 200. After receiving the second multi-cast request, each monitored PLC modem 210 responds the body presence information of each monitored area 200 to the data processing module 113 via the monitoring PLC modem 120. Accordingly, the data processing module 113 receives the body presence information of each monitored area 200 from each monitored PLC modem 210 via each monitoring PLC modem 120.

Figure 3:
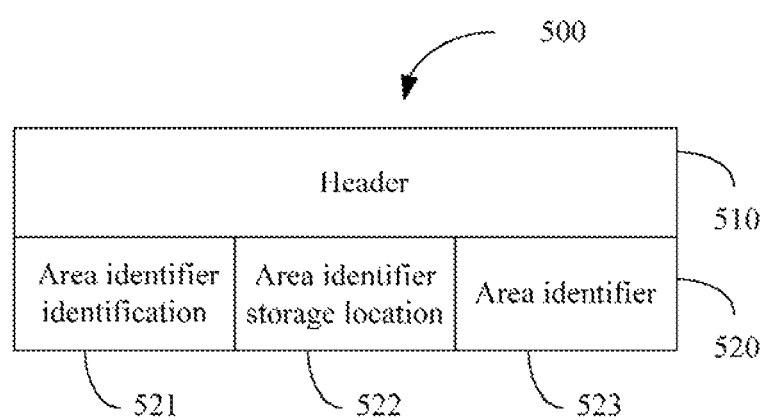
FIG. 3 is a schematic diagram of one embodiment of a transport control protocol packet used by an energy management device in according with the present disclosure.

FIG. 3 is a schematic diagram of one embodiment of a transport control protocol (TCP) packet 500 used by the energy management device 110 in accordance with the present disclosure. In one embodiment, the TCP packet 500 may be the first multi-cast request transmitted from the energy management device 110 to the monitored area 200, or a response transmitted from the monitored PLC modem 210 of the monitored area 200 to the energy management device 110.

The TCP packet 500 includes a header field 510 and a data field 520. The header field 510 is set according to the TCP. The data field 520 includes an area identifier identification field 521, an area identifier storage location field 522, and an area identifier field 523. When the TCP packet 500 is the first multi-cast request transmitted from the energy management device 110 to the monitored area 200, the area identifier identification field 521 is used to inform the monitored area 200 to respond its area identifier to the energy management device 110, and the area identifier storage location field 522 is used to inform the monitored area 200 to put its area identifier in the area identifier field 523.

After receiving the first multi-cast request, the monitored PLC modem 210 of the monitored area 200 parses the area identifier identification field 521 and the area identifier storage location field 522 of the first multi-cast request, and puts the area identifier of the monitored area 200 in the area identifier field 530 of a response, and transmits the response with the area identifier of the monitored area 200 to the energy management device 110.

Figure 4:
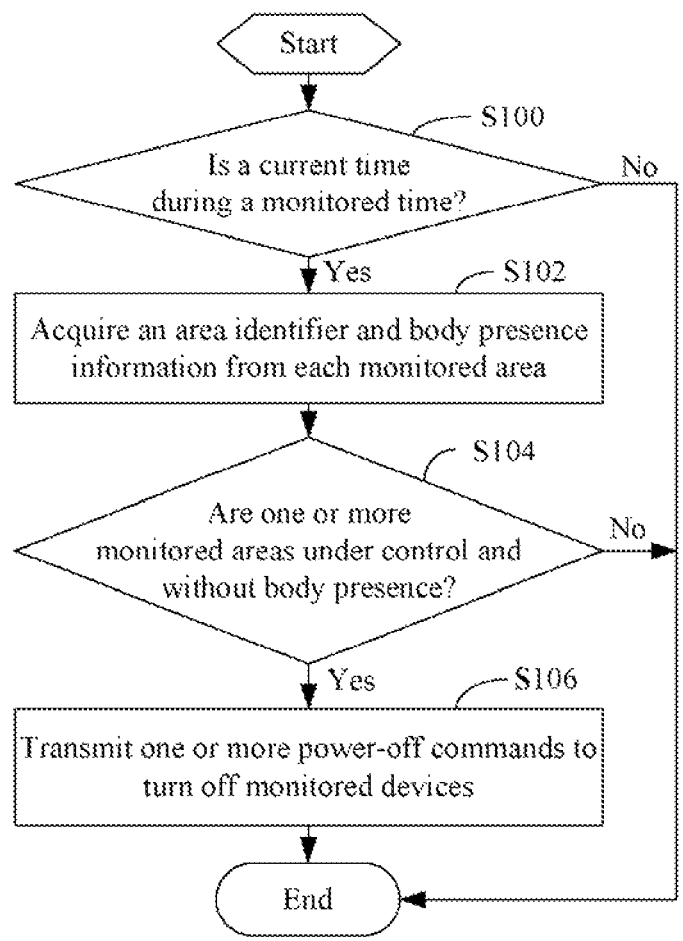
FIG. 4 is a flowchart of one embodiment of an energy management method in accordance with the present disclosure.

FIG. 4 is a flowchart of one embodiment of an energy management method in accordance with the present disclosure. The method may be embodied in the energy management device 110, and is executed by the functional modules such as those of FIG. 1. Depending on the embodiment, additional blocks may be added, others deleted, and the ordering of the blocks may be changed while remaining well within the scope of the disclosure.

In block S100, the time control module 111 determines whether a current time of each monitored area 200 is during a monitored time of the energy management device 110.

If the current time is during the monitored time, the data processing module 113 acquires the area identifier and the body presence information from each monitored area 200 shown in block S102.

In block S104, the data processing module 113 determines whether one or more monitored areas 200 are under control and without body presence according to the area identifier and the body presence information from each monitored area 200.

If one or more monitored areas 200 are under control and without body presence, in block S106, the data processing module 113 transmits one or more power-off commands to turn off the monitored devices 230 located in the one or more monitored areas 200, such that energy consumption is reduced.

While various embodiments and methods of the present disclosure have been described above, it should be understood that they have been presented by way of example only and not by way of limitation. Thus the breadth and scope of the present disclosure should not be limited by the above-described embodiments, but should be defined only in accordance with the following claims and their equivalents.

What is claimed is:

1. An energy management device for managing a plurality of monitored devices distributed in a plurality of monitored areas, the energy management device comprising:
at least one processor;
memory operable to store a plurality of area identifiers of monitored areas under control by the energy management device;
one or more programs that are stored in the memory and are executed by the at least one processor, the one or more programs comprising:
a time control module operable to determine whether a current time of each of the monitored areas is during a monitored time of the energy management device; and
a data processing module operable to acquire an area identifier of each of the monitored areas transmitted by a monitored power line communication (PLC) modem located in each of the monitored areas and a body presence information of each of the monitored areas transmitted by a monitoring device located in each of the monitored areas when the current time is during the monitored time, determine whether one or more monitored areas are under control by the energy management device and without body presence according to the area identifier and the body presence information, and transmit one or more power-off commands to turn off the monitored devices located in the one or more monitored areas; and
a monitoring PLC modem connected to the monitored PLC modem via a power line, and further connected to the monitoring device via the monitored PLC modem;
wherein the data processing module transmits a first multi-cast request to each of the monitored areas via the monitoring PLC modem to request the area identifier of each of the monitored areas, and the monitored PLC modem located in each of the monitored areas responds with the area identifier of each of the monitored areas to the data processing module via the monitoring PLC modem; and
wherein the first multi-cast request is a transport control protocol (TCP) packet comprising an area identifier identification field, an area identifier storage location field, and an area identifier field, the area identifier identification field is used to inform each of the monitored areas to respond with its area identifier, and the area identifier storage location field is used to inform each of the monitored areas to put its area identifier in the area identifier field.

2. The energy management device of claim 1, wherein the monitored PLC modem located in each of the monitored areas multicasts the area identifier of each of the monitored areas, and the data processing module receives the area identifier of each of the monitored areas from the monitored PLC modem via the monitoring PLC modem.

3. The energy management device of claim 1, wherein the monitoring device located in each of the monitored areas multicasts the body presence information of each of the monitored areas via the monitored PLC modem, and the data processing module receives the body presence information of each of the monitored areas via the monitored PLC modem and the monitoring PLC modem.

4. The energy management device of claim 1, wherein the data processing module is further operable to transmit a second multi-cast request to each of the monitored areas via the monitoring PLC modem to request the body presence information of each of the monitored areas, and the monitoring device located in each of the monitoring areas responds with the body presence information of each of the monitored areas to the data processing module via the monitored PLC modem and the monitoring PLC modem.

5. An energy management method of an energy management device operable to manage a plurality of monitored devices distributed in a plurality of monitored areas, the energy management method comprising:
- providing a plurality of area identifiers of monitored areas under control by the energy management device, and a monitoring power line communication (PLC) modem connected to a monitored PLC modem via a power line, and further connected to a monitoring device via the monitored PLC modem;
- determining whether a current time of each monitored area is during a monitored time of the energy management device;
- acquiring an area identifier of each of the monitored areas transmitted by the monitored PLC modem located in each of the monitored areas and a body presence information of each of the monitored areas transmitted by the monitoring device located in each of the monitored areas if the current time is during the monitored time;
- determining whether one or more monitored areas are under control and without body presence according to the area identifier and the body presence information; and
- transmitting one or more power-off commands to turn off the monitored devices located in the one or more monitored areas under control without body presence;
- wherein the acquiring step comprises:
  - the monitoring PLC modem transmitting a first multi-cast request to each of the monitored areas to request the area identifier of each of the monitored areas; and
  - the monitored PLC modem responding with the area identifier of each of the monitored areas to the monitoring PLC modem; and
- wherein the first multi-cast request is a transport control protocol (TCP) packet comprising an area identifier identification field, an area identifier storage location field, and an area identifier field, the area identifier identification field is used to inform each of the monitored areas to respond with its area identifier, and the area identifier storage location field is used to inform each of the monitored areas to put its area identifier in the area identifier field.

6. The energy management method of claim 5, wherein the acquiring step further comprises:
- the monitored PLC modem located in each of the monitored areas multicasting the area identifier of each of the monitored areas; and
- the monitoring PLC modem receiving the area identifier of each of the monitored areas from the monitored PLC modem.

7. The energy management method of claim 5, wherein the acquiring step further comprises:
- the monitoring device located in each of the monitored areas multicasting the body presence information of each of the monitored areas via the monitored PLC modem; and
- the monitoring PLC modem receiving the body presence information of each of the monitored areas from the monitoring device via the monitored PLC modem.

8. The energy management method of claim 5, wherein the acquiring step further comprises:
- the monitoring PLC modem transmitting a second multi-cast request to each of the monitored areas to request the body presence information of each of the monitored areas; and
- the monitoring device responding with the body presence information of each of the monitored areas to the monitoring PLC modem via the monitored PLC modem.

* * * * *